3,540,807
PHOTOGRAPHIC COPYING MACHINE
Hans W. Minikes, Siegen, Germany, assignor to Eurograph Gesellschaft für Photomechanik m.b.H., a corporation of Germany
Filed July 15, 1968, Ser. No. 744,885
Claims priority, application Germany, July 21, 1967,
E 25,480
Int. Cl. G03b 27/70
U.S. Cl. 355—60  9 Claims

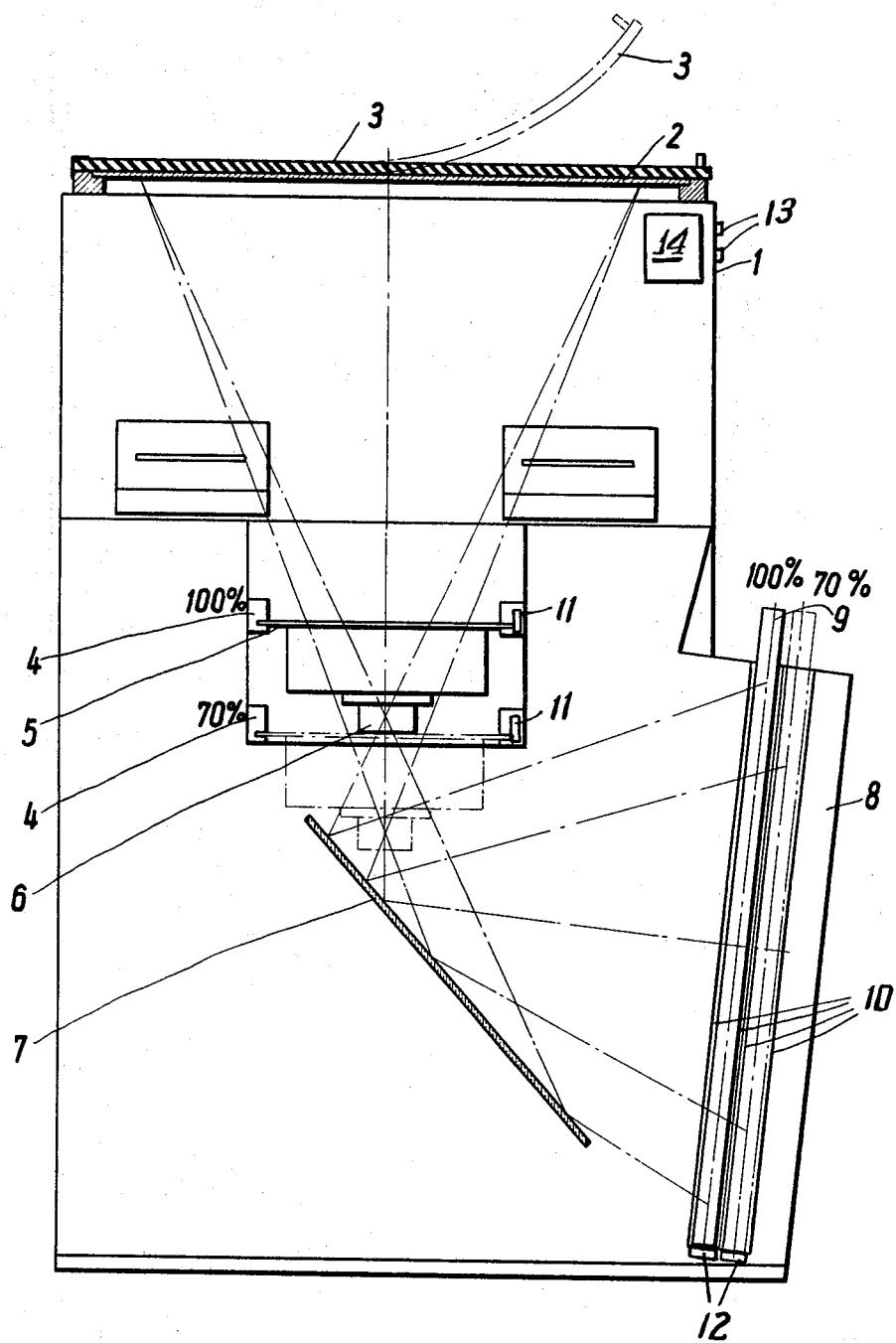

ABSTRACT OF THE DISCLOSURE

A photographic copying machine of the type used for the making of negatives for offset printing. The copy may be full-sized or reduced. Material to be copied is placed on a horizontal glass at the top of the machine. A lens is mounted below the glass at an adjustable height depending on the reproduction size desired, and an oblique mirror reflects the image to one side onto negative material in a cassette. The cassette is variably positioned in guides according to the reproduction size desired. Preferably, micro-switches detect the position of the lens and the cassette, and operate indicator lights as to position. The micro-switches may be wired through an interlock to insure operation only when the lens and cassette positions are properly correlated.

---

This invention relates to photographic copying machines, particularly but not exclusively for producing negatives for use in off-set printing.

The invention is particularly concerned with a photographic copying machine for making reproduction negatives, in which an objective projects the image of an element to be copied, via an inclined deflector mirror, onto negative material displaced laterally from the mirror. The machine may have a substantially rectilinar housing, an exposure surface for the element to be copied being formed in the top of the housing in which is located the objective and mirror. Such a machine, which is used particularly for making negatives for off-set printing, has the advantage of simple construction and correspondingly low price. In addition, the so-called console form of construction, stemming from its rectilinear form of housing, enables the machine to match other items of office furniture.

It is frequently desired not only to make negatives of the same size as the original element to be copied (i.e., on a scale of 1:1), but also to carry out a reduction simultaneously with the reproduction. The usual reduction required is thirty percent; i.e., the area of the negative is to be seventy percent of the area of the element to be copied.

In accordance with the present invention, a photographic copying machine comprises a housing, an exposure surface formed in a face of the housing to receive the element to be copied, an objective adjustably mounted within the housing at a variable distance from the exposure surface, a deflector mirror inclined with respect to the axis of the objective, and means for mounting negative material at an adjustable distance from the mirror, the objective being arranged to project an image of an element on the exposure surface via the deflector mirror on to negative material mounted in the mounting means. In this way, the scale of reproduction may be selected, without unduly complicating the machine or its operation, the distance of the objective from the exposure surface and the distance of the mounting means from the mirror being chosen to achieve the required reduction.

Preferably the housing is substantially rectilinear, with the exposure surface formed in the top. In this case, the objective is mounted below the exposure surface so as to be adjustable in height and the mirror is arranged laterally of the objective.

The height of the objective is preferably varied with the help of a plurality of guide surfaces for the objective carrier plate, the guide surfaces being arranged at various heights below the objective and the guide surface appropriate to the reduction being chosen; however, there may be a single guide surface for the objective carrier plate, which can be adjusted in height manually or by an electric motor. The position of the objective in any particular case may be indicated by indicator lights switched by micro-switches which project into the path or paths on which the carrier plate slides.

The distance of the negative material from the deflector mirror may be varied in a similar simple fashion. For example, the housing may have a lateral projecting part facing the mirror, the mounting means for the negative material being arranged in that path to permit a negative cassette to be slid from above into the housing at an adjustable distance from the mirror. In this case also, there may be a series of slide surfaces to receive the cassette, or a single guide surface which may be displaced manually or by an electric motor. The position in any particular case of the cassette may be indicated on the copying machine control desk in a similar manner to the position of the objective. The microswitches controlling the indicators may also be linked up in such a manner that the indicator lights are switched on and exposure permitted to take place, only when the objective and cassette are in mutually compatible positions for proper reproduction.

The invention will be more readily understood by way of example from the following description of a photographic copying machine in accordance therewith, reference being made to the accompanying drawing which shows the machine in diagrammatic cross-section.

Referring to the drawing, the copying machine has a rectilinear housing 1, the top of which is made in the form of an exposure surface. For this purpose, there is a glass plate 2 mounted horizontally and carrying a very flexible, high density, rubber cover 3. The element to be copied is placed on the glass plate 2 and covered with the rubber cover 3, which may be lifted laterally, as shown in chain line, to permit entry of the element. Illumination lamps (not illustrated) are incorporated in the housing below the exposure surface, in order to illuminate the element with high intensity.

Beneath the exposure surface are located a series of pairs of slide ledges 4, to locate and support the carrier plate 5 of an objective 6 at differing heights from the exposure surface. Only two such pairs of slide ledges 4 are illustrated in the drawing, corresponding to reproduction ratios of one hundred percent and seventy percent, the objective, when located on the seventy percent ledges being shown in chain line. As indicated, the slide ledges 4 are arranged to mount the objective with its axis vertical and with that axis disposed approximately centrally of the exposure surface.

A deflector mirror 7 is arranged below the objective 6 and projects the image of an element on the glass plate 2 to the right-hand side of the machine, as viewed in the drawing. At that side, the housing 1 has a projecting part 8 into which a cassette 9 for negative material may be inserted from above. The cassette 9 is guided and located by means of a series of pairs of guide surfaces 10, the pairs being disposed at differing distances from the mirror 7. In the drawing, two pairs of such guide surfaces are shown, corresponding again to reproduction ratios of one hundred percent (full line) and seventy percent (chain line). It will be appreciated that if other reproduction ratios are required, the number of slide ledges and surfaces for the objective plate 5 and the negative cassette 9 may be provided. Similarly, the machine may be so arranged that the position of the objective 6 and the position of the negative cassette 9 may be infinitely variable, either by hand or by an electric motor or motors, to achieve any required reproduction ratio within a permissible range. Micro-switches 11 and 12 respectively are provided to be actuated selectively by the objective plate 5 and the negative cassette 9, according to their relative positions, and in order to operate indicator lamps 13 indicating the positions in question. The micro-switches for the objective and the cassette, preferably are interlocked through a switch or control box 14 so that an indication is given, and operation of the machine permitted, only when the objective and cassette are in corresponding positions for correct reproduction.

What is claimed is:

1. A photographic copying machine comprising a housing, a fixed exposure surface formed in a face of the housing to receive the element to be copied, an objective adjustably mounted within the housing at a variable distance from the exposure surface, a deflector mirror inclined with respect to the axis of the objective at a fixed distance from said exposure surface, and means for mounting negative material at an adjustable distance from the mirror, the objective being arranged to project an image of an element on the exposure surface via the deflector mirror on to negative material mounted in the mounting means.

2. A photographic copying machine comprising a substantially rectilinear housing, a fixed exposure surface formed in the top of the housing to receive the element to be copied, an objective adjustably mounted within the housing at a variable height below the exposure surface, an inclined deflector mirror at a fixed distance from said exposure surface, and means for mounting negative material upstandingly at an adjustable lateral distance from the mirror, the objective being arranged to project an image via the deflector mirror on to negative material mounted in the mounting means.

3. A photographic copying machine according to claim 2 in which the housing has a plurality of guide surfaces which are disposed at different heights below the exposure surface and each of which is arranged to receive the carrier plate of the objective.

4. A photographic copying machine comprising a substantially rectilinear housing, an exposure surface formed in the top of the housing to receive the element to be copied, an objective adjustably mounted within the housing at a variable height below the exposure surface, an inclined deflector mirror, and means for mounting negative material upstandingly at an adjustable lateral distance from the mirror, the objective being arranged to project an image via the deflector mirror on to negative material mounted in the mounting means, sensing means arranged to be selectively operated by the objective according to the position in which it is mounted, and indicator lamps operable thereby.

5. A photographic copying machine comprising a substantially rectilinear housing, an exposure surface formed in the top of the housing to receive the element to be copied, an objective adjustably mounted within the housing at a variable height below the exposure surface, an inclined deflector mirror, and means for mounting negative material upstandingly at an adjustable lateral distance from the mirror, the objective being arranged to project an image via the deflector mirror on to negative material mounted in the mounting means, the housing having a plurality of guide surfaces which are disposed at different heights below the exposure surface and each of which is arranged to receive the carrier plate of the objective, sensing means arranged to be selectively operated by the objective according to the position in which it is mounted, and indicator lamps operable thereby.

6. A photographic copying machine according to claim 2 in which a photographic copying machine comprising a substantially rectilinear housing, an exposure surface formed in the top of the housing to receive the element to be copied, an objective adjustably mounted within the housing at a variable height below the exposure surface, an inclined deflector mirror, and means for mounting negative material upstandingly at an adjustable lateral distance from the mirror, the objective being arranged to project an image via the deflector mirror on to negative material mounted in the mounting means, the housing having a lateral projecting part facing the mirror and the mounting means comprise a plurality of upright guides arranged in that part to permit a negative cassette to be slid from above into the housing at an adjustable distance from the mirror.

7. A photographic copying machine according to claim 5 in which the mounting means comprise a plurality of upstanding guide surfaces on the walls of the projecting part, each guide surface being disposed at a different distance from the mirror.

8. A photographic copying machine according to claim 5 in which there are sensing means arranged to be selectively operated by a negative cassette according to the distance from the mirror the cassette is introduced and to operate indicator lamps.

9. A photographic copying machine according to claim 6 in which there are sensing means arranged to be selectively operated by a negative cassette according to the distance from the mirror the cassette is introduced and to operate indicator lamps.

References Cited
UNITED STATES PATENTS

| | | | |
|---|---|---|---|
| 1,208,071 | 12/1916 | Wynkood | 355—60 |
| 2,468,935 | 5/1949 | Langdon | 355—60 |
| 2,484,048 | 10/1949 | Powers et al. | 355—18 |
| 3,437,410 | 4/1969 | Tregay et al. | 355—57 |

NORTON ANSHER, Primary Examiner

MICHAEL D. HARRIS, Assistant Examiner

U.S. Cl. X.R.

355—66, 74